L. A. Towne
Clothes-Rack.
No. 92,905. Patented Jul. 20, 1869.
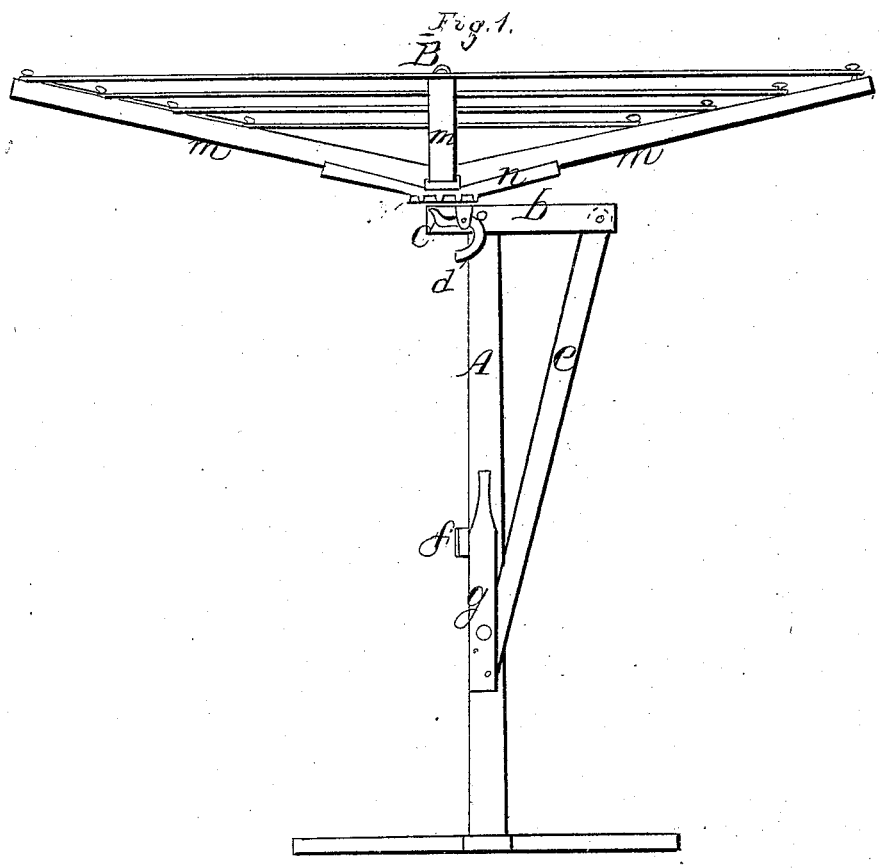
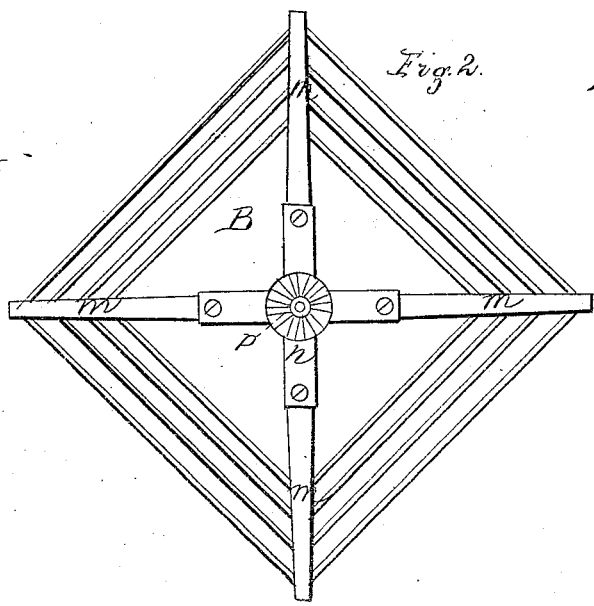
Witnesses
John A. Ellis
J. P. White
Inventor
L. A. Towne
Per=
J. H. Alexander
Atty

United States Patent Office.

LEWIS A. TOWNE, OF LA CROSSE, WISCONSIN.

Letters Patent No. 92,905, dated July 20, 1869.

---

IMPROVED CLOTHES-DRIER.

---

The Schedule referred to in these Letters Patent and making part of the same.

---

*To all whom it may concern:*

Be it known that I, LEWIS A. TOWNE, of La Crosse, in the county of La Crosse, and State of Wisconsin, have invented certain new and useful Improvements in Clothes-Reels; and I do hereby declare that the following is a full, clear, and exact description thereof, reference being had to the accompanying drawings, and to the letters of reference marked thereon, which form a part of this specification, and in which—

Figure 1 represents a side view, and

Figure 2, an inverted view of the rack of my clothes-frame.

Similar letters of reference indicate like parts in both figures.

The nature of my invention consists in the employment of a pivoted lever for inclining the rack in any desired position.

It further consists in providing the rack with a pinion, in combination with a hook or clasp, attached to the standard, substantially in the manner and for the purpose hereinafter specified.

To enable others skilled in the art to which my invention appertains, to make and use the same, I will now describe its construction and operation.

In the accompanying drawings—

A represents the standard, which is provided, at its upper end, with the pivoted bar $b$, which is formed at one end with the metal plate and pin $c$.

$d$ is a hook, pivoted in a projection formed on the side of the plate $c$, the object of which will be hereinafter described.

The other end of the bar $b$ is slotted, into which slot is pivoted one end of the pitman $e$, the other end of the pitman being attached to the pivoted lever $g$.

$f$ is a button, secured to the standard for retaining the lever $g$ in place.

B represents the rack, consisting of the arms $m$ $m$ $m$ $m$, secured, as seen in the drawing, fig. 2, to the metal plate $n$.

The plate $n$ is formed on its lower surface with the pinion $p$.

The operation of my machine is as follows:

The rack is inserted in the plate $c$, and by operating the lever $g$, any direction may be given to the rack.

The hook, $d$ working in the pinion $p$, prevents the rack from revolving, when desired.

Having thus described my invention,

What I claim as new, and desire to secure by Letters Patent, is—

A clothes-rack, consisting of standard A, bar $b$, pitman $e$, lever $g$, plate $n$, pinion $p$, hook $d$, and rack B, all combined, arranged, and operating substantially in the manner and for the purpose described.

In testimony that I claim the foregoing as my own, I affix my signature, in presence of two witnesses.

LEWIS A. TOWNE.

Witnesses:
J. W. HAMMOND,
BENJ. F. BRYANT.